(12) United States Patent
Hohmann

(10) Patent No.: US 6,571,471 B2
(45) Date of Patent: Jun. 3, 2003

(54) METHOD AND DEVICE FOR DEMOUNTING A TURBINE BLADE

(75) Inventor: Siegfried Hohmann, Waldshut (DE)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/832,839

(22) Filed: Apr. 12, 2001

(65) Prior Publication Data

US 2001/0032389 A1 Oct. 25, 2001

(30) Foreign Application Priority Data

Apr. 25, 2000 (DE) .......................................... 100 20 229

(51) Int. Cl.[7] ................................................. B23P 6/00
(52) U.S. Cl. ..................................... 29/889.1; 29/426.5
(58) Field of Search ........................ 29/251, 252, 426.5, 29/889.1

(56) References Cited

U.S. PATENT DOCUMENTS

| | | | | |
|---|---|---|---|---|
| 4,078,290 A | * | 3/1978 | Fletcher et al. ............... | 29/244 |
| 4,096,614 A | * | 6/1978 | Brungard et al. ............. | 29/244 |
| 4,141,124 A | * | 2/1979 | Ryan ............................ | 29/252 |
| 4,400,137 A | * | 8/1983 | Miller et al. ................ | 29/889.1 |
| 4,455,730 A | | 6/1984 | Guenther | |
| 5,560,841 A | | 10/1996 | DeMichael et al. | |
| 5,690,469 A | * | 11/1997 | Deal et al. .................. | 415/189 |
| 6,375,423 B1 | * | 4/2002 | Roberts et al. ............... | 416/2 |

FOREIGN PATENT DOCUMENTS

| | | |
|---|---|---|
| DE | 294650 A5 | 10/1991 |
| DE | 68908250 T2 | 8/1993 |
| EP | 0 013 772 | 8/1980 |
| RU | 1611682 | 9/1988 |

* cited by examiner

Primary Examiner—I Cuda-Rosenbaum
(74) Attorney, Agent, or Firm—Burns, Doane, Swecker & Mathis, L.L.P.

(57) ABSTRACT

The invention relates to a method and a device for demounting a turbine blade out of an axial groove of a rotor or stator. The turbine blade is demounted with a hydraulic device by means of a hooked slide which is located in a gap between the blade base of the blade root and the groove bottom of the axial groove. At the same time, the hooks of the hooked slide engage into clearances which are located at the blade root.

6 Claims, 2 Drawing Sheets

METHOD AND DEVICE FOR DEMOUNTING A TURBINE BLADE

This application claims priority under 35 U.S.C. §§19 and/or 365 to Appln. No. 100 20 229.2 filed in Germany on Apr. 25, 2000; the entire content of which is hereby incorporated by reference.

FIELD OF THE INVENTION

The invention relates to a method for demounting a turbine blade according to the preamble of claim 1. The invention also relates to a device for applying the method.

BACKGROUND OF THE INVENTION

In the demounting of turbine blades which are arranged in a groove on the rotor or on the stator of the thermal turbomachine, it is known from the prior art to demount these by means of a so-called expeller. This expeller, which is usually operated pneumatically and is also designated as a pneumatic hammer, engages on the root plate in the region of the profiled issue of the rear side of the turbine blade, in order to expel the latter out of the axial groove.

However, this type of demounting has various disadvantages. Since there is only a very small amount of space between two rows of moving blades, for example of a gas turbine, the expulsion tool can be applied to the root plate only at an unfavorable angle to the expulsion direction. The result of this is that demounting becomes correspondingly time-consuming and difficult, since the force component expelling the blade root out of the groove is very low. Due to deposits between the axial groove and the blade root, a high coefficient of friction prevails between the two parts, and this makes it even more difficult to remove the turbine blade. As a result of the unfavorable point of engagement for the introduction of force, a tilting moment is generated at the blade root and makes it very difficult or even possible to remove the turbine blade. The expulsion tool may also damage a protective layer which is present, if appropriate, and which is applied to the surface of the turbine blade, even though the tool is equipped at the blade contact point with a nylon covering with which an attempt is made to avoid damage of this kind.

SUMMARY OF THE INVENTION

The object of the invention is to avoid the disadvantages mentioned. The invention achieves the object of providing a device and a method which makes it possible to remove a turbine blade in a simplified way. Moments on the turbine blade are to be avoided or reduced to a minimum during demounting. A protective layer which is present, if appropriate, is not to be damaged during demounting.

According to the present invention, this object is further achieved when turbine blade is drawn out of the circumferential groove in the axial direction by means of a device which engages on the blade root of the turbine blade in an embodiment of the present invention.

Advantageously, the force is generated entirely in the axial direction, thus virtually eliminating a moment leading to tilting. Moreover, the time for demounting the turbine blades is markedly reduced in this way.

In a particular embodiment, the turbine blade is demounted by means of a hooked slide. The hooked slide is introduced into a gap located between the blade base and the groove bottom and is removed there by means of at least one hook which is anchored in at least one clearance at the blade root. If present, an existing cooling-air bore of the turbine blade may advantageously be used as a clearance.

A supporting slide advantageously serves additionally to secure the position of the hooked slide during demounting. The turbine blade can be drawn out by means of the hooked slide by a device which is operated hydraulically and which is supported on the rotor or stator on supports next to the hooked slide and the axial groove.

The method according to the invention is suitable, in particular, for the demounting of guide vanes or moving blades in gas turbines, steam turbines or compressors.

The invention also relates to a device for applying the demounting method according to the preamble of claim 8. The device is characterized in that the demounting device consists of a hydraulically operated piston generating a tensile force which acts in the axial direction and which can be transmitted to the blade root of the turbine blade in such a way that it is possible to demount the turbine blade, and, in addition, next to the blade root, on the rotor or stator, means are present which are connected to the hydraulically driven piston in such a way that, during the demounting of the turbine blade, they allow support with respect to the tensile force generated by the piston. In addition, a hooked or supporting slide may be present, which makes demounting possible.

BRIEF DESCRIPTION OF THE DRAWINGS

In the drawing.

Only the elements essential to the invention are illustrated. Identical elements are given the same reference symbols in different drawings.

DETAILED DESCRIPTION OF THE INVENTION

The invention relates to a method and a device for demounting a turbine blade 1 out of an axially arranged groove 3 of a rotor 8 or of a stator of a thermal turbomachine. The turbine blade 1 may be, for example, a guide vane or a moving blade of a gas turbine, steam turbine or compressor.

Figure 1:
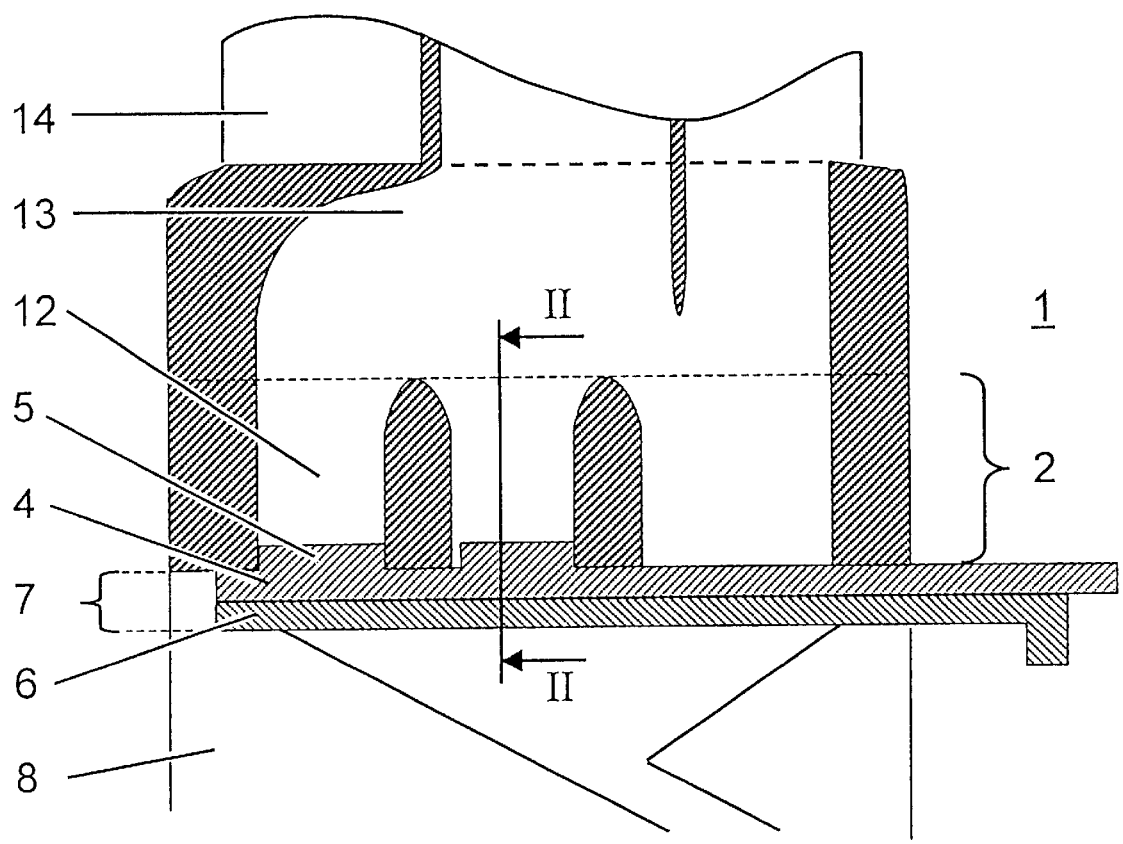
FIG. 1 shows a section through the blade root of a turbine blade with a demounting device according to the invention.

FIG. 1 shows a section through the blade root 2 of such a turbine blade 1. The turbine blade 1 is equipped, inside, with a cooling system 13 which receives cooling air while the thermal turbo machine is in operation. The cooling air passes through cooling ventilation holes 12, which are located at the blade base, into the cooling system 13. However, this is generally known from the prior art and is not illustrated in any more detail in the figures.

The demounting of the turbine blade 1 out of the axial groove, as illustrated in FIG. 1, is carried out by means of two slides, a hooked slide 4 and a supporting slide 6. The hooked slide 4 is introduced into a gap 7 which is located between the blade base and the groove bottom. Hooks 5, which are located on the hooked slide 4, then engage into the cooling-air holes 12 or into other clearances located at the blade base. In a further method step, the supporting slide 6 is introduced under the hooked slide 4. This supporting slide 6 positively adjoins the hooked slide 4 and ensures that the hooked slide 4 is secured in position during the demounting of the turbine blade 1.

Figure 2:
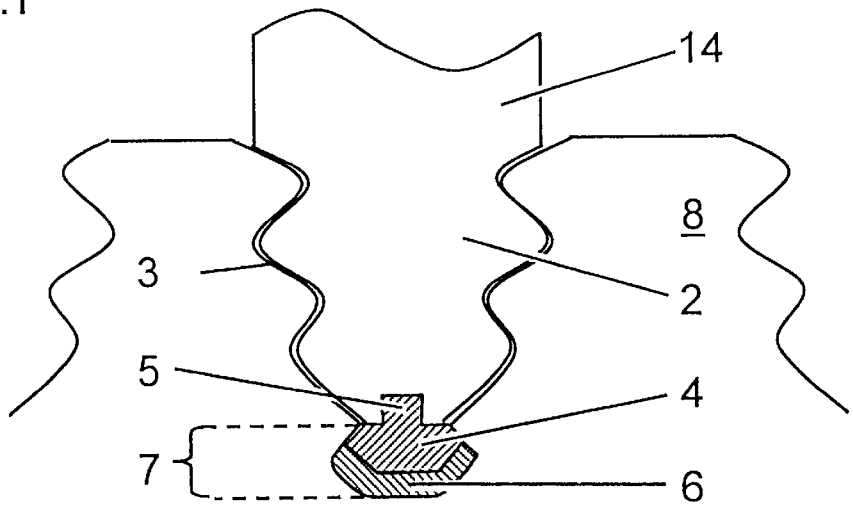
FIG. 2 shows a section through a turbine blade along the line II—II in FIG. 1.

FIG. 2 shows a corresponding section through the blade root 2 of a turbine blade 1 along the line II—II in FIG. 1. Both the two slides, the hooked slide 4 and the supporting slide 6 positively adjoining the latter below it, and the hooks 5 can be seen there. Both are located in the gap 7 below the blade root 2 between the blade base of the turbine blade 1 and the groove bottom of the axial groove 3.

Figure 3:
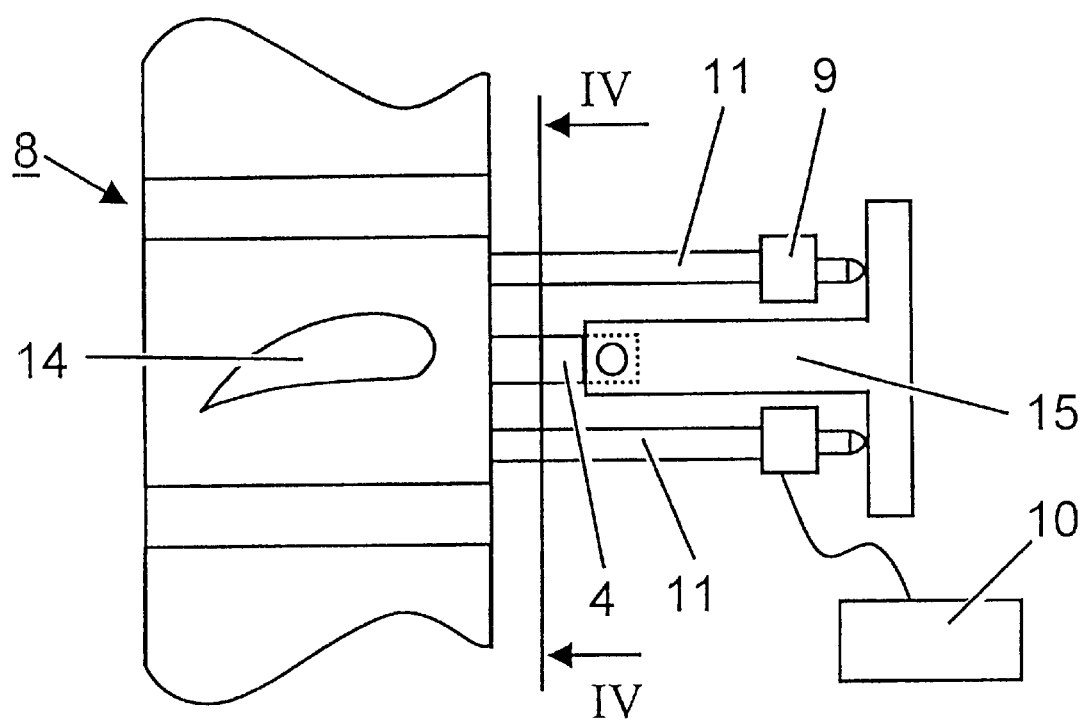
FIG. 3 shows a view of a demounting device according to the invention from above.
Figure 4:
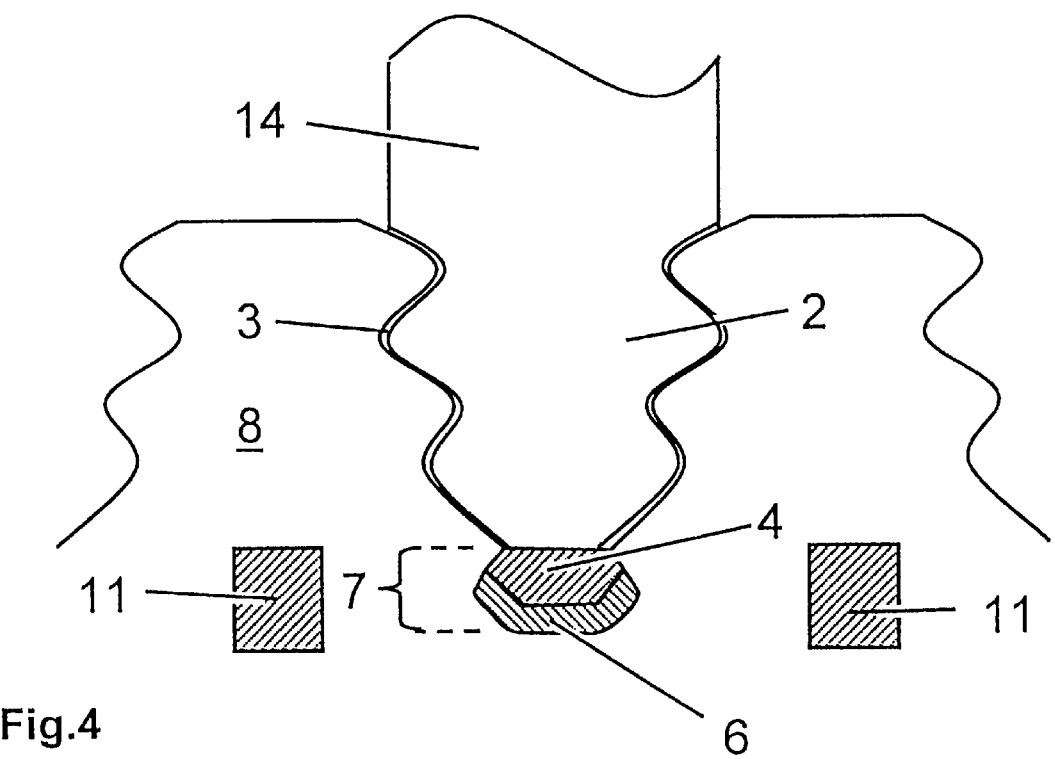
FIG. 4 shows a section along the line IV—IV in FIG. 3.

As can be seen in FIGS. 3 and 4, in order to demount the turbine blade 1, the hooked slide 4 is connected to a piston 15. Should possibilities be present, this piston 15 could also engage directly on the turbine blade 1. The turbine blade is drawn out of the axial groove 3 via a hydraulic cylinder 9 which is driven by means of a hydraulic pump 10. At the same time, a tensile force applied in the axial direction acts on the turbine blade 1. So that this tensile force can act on the blade root 2 of the turbine blade 1, the hydraulic cylinder 9 is supported on two supports 11 which engage on the rotor 8 next to the hooked slide 4. FIG. 4, which shows a section through the demounting device along the line IV—IV in FIG. 3, discloses the arrangement of the two supports 11 on the rotor 8 next to the axial groove 3. By the hydraulic cylinder 9 being used, very high forces can be generated and transmitted to the turbine blade 1.

The demounting according to the invention of the turbine blade 1, as disclosed in the present description, has various advantages, as compared with the prior art. Since an axial tensile force acts on the blade root 2, disturbing moments causing tilting of the blade root are virtually prevented. The reason for this, in particular, is that the line of action of the applied tensile force during the demounting according to the invention is appreciably nearer to a desired line of action than in the methods known hitherto from the prior art. The demounting time is reduced considerably by means of the proposed method as a result of these facts.

What is claimed is:

1. A method for demounting a turbine blade which is fastened in an axially oriented groove of a rotor or stator of a turbomachine by means of a blade root, the method comprising drawing the turbine blade out of the groove in an axial direction by means of a device which engages on the blade root of the turbine blade, where the operation of drawing the turbine blade further comprises applying a tensile force acting in the axial direction by means of a piston driven by a hydraulic cylinder and which engages directly or indirectly on the blade root of the turbine blade where supports are present next to the blade root of the turbine blade on the rotor or stator, on which the hydraulic cylinder is supported, so that the hydraulic cylinder transmits to the piston the tensile force acting in the axial direction; and introducing a hooked slide into a gap located between the blade base and the groove bottom and anchoring the hooked slide to the blade root there by means of at least one hook which is located in at least one clearance located at the blade base, and the turbine blade is drawn out by means of the hooked slide and the piston fastened to the latter.

2. The demounting method as claimed in claim 1, the method further comprising introducing a supporting slide is introduced under the hooked slide before the turbine blade is demounted by means of the hooked slide.

3. The demounting method as claimed in claim 1, the method further comprising anchoring the at least one hook of the hooked slide in at least one cooling ventilation hole which is located in the form of a clearance at the blade base.

4. The demounting method as claimed in claim 1, wherein the turbine blade is a guide vane or moving blade of a gas turbine, steam turbine or compressor.

5. A demounting device for demounting a turbine blade, the demounting device comprising a hydraulically operated piston, by means of which a tensile force acting in an axial direction can be generated, which can be transmitted to a blade root of the turbine blade thereby demounting the turbine blade; and supports connected to the hydraulically operated piston such that during the demounting of the turbine blade, the supports allow support with respect to the tensile force acting on the piston wherein during the demounting of the turbine blade, the hydraulically operated piston is connected to a hooked slide which is detained at a blade base of the blade root by means of at least one hook at a clearance, the hooked slide being located in a gap between the blade base and a groove bottom.

6. The demounting device as claimed in claim 5, wherein, during the demounting of the turbine blade, a supporting slide is arranged below the hooked slide.

* * * * *